United States Patent
Lenzing et al.

(10) Patent No.: US 7,124,626 B2
(45) Date of Patent: Oct. 24, 2006

(54) DEVICE FOR DETERMINING AT LEAST ONE PARAMETER OF A MEDIUM FLOWING IN A LINE

(75) Inventors: Thomas Lenzing, Benningen (DE); Hans Beyrich, Freiberg (DE); Roland Mueller, Steinheim (DE); Uwe Konzelmann, Asperg (DE); Tobias Lang, Stuttgart (DE); Henning Marberg, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/511,839

(22) PCT Filed: Apr. 9, 2003

(86) PCT No.: PCT/DE03/01161

§ 371 (c)(1), (2), (4) Date: Oct. 25, 2004

(87) PCT Pub. No.: WO2004/031701

PCT Pub. Date: Apr. 15, 2004

(65) Prior Publication Data

US 2005/0217357 A1 Oct. 6, 2005

(30) Foreign Application Priority Data

Sep. 30, 2002 (DE) ............... 102 45 965

(51) Int. Cl.
G01M 15/00 (2006.01)

(52) U.S. Cl. ................ 73/118.1; 73/202

(58) Field of Classification Search ........ 73/116, 73/117.2, 117.3, 118.1, 118.2, 119 R, 861, 73/202, 202.5

See application file for complete search history.

(56) References Cited

U.S. PATENT DOCUMENTS 5,546,794 A * 8/1996 Kuhn et al. .............. 73/118.2

(Continued)

FOREIGN PATENT DOCUMENTS

DE 196 23 334 12/1997

(Continued)

*Primary Examiner*—Eric S. McCall
(74) *Attorney, Agent, or Firm*—Kenyon & Kenyon LLP

(57) ABSTRACT

A device for determining at least one parameter of a medium flowing in a line, particularly the intake air mass of an internal combustion engine, having one part which has at least one measuring channel for conducting at least one partial flow of the medium flowing in the line in a main flow direction and which can be inserted into the line with a predetermined alignment with respect to the main flow direction, and having at least one measuring element situated in the measuring channel for determining the at least one parameter. In the part, a channel structure is formed, having an input region for the entry of a partial flow of the medium and having a measuring channel branching off from the input region. The input region has a separation zone with a separation opening, and at least two projections which protrude from mutually opposite interior walls of the input region into the input region.

9 Claims, 2 Drawing Sheets

U.S. PATENT DOCUMENTS

| | | |
|---|---|---|
| 6,332,356 B1 | 12/2001 | Hecht et al. |
| 6,557,408 B1 * | 5/2003 | Mueller et al. ............ 73/202.5 |
| 6,619,114 B1 * | 9/2003 | Lenzing et al. ............ 73/202.5 |
| 6,645,274 B1 * | 11/2003 | Rilling et al. ................. 95/267 |
| 6,779,393 B1 * | 8/2004 | Muller et al. .............. 73/202.5 |
| 6,851,309 B1 * | 2/2005 | Lenzing et al. .......... 73/204.22 |
| 6,915,682 B1 * | 7/2005 | Renninger et al. ......... 73/118.2 |
| 6,973,823 B1 * | 12/2005 | Lenzing et al. ............ 73/118.2 |
| 2003/0159501 A1 * | 8/2003 | Renninger et al. ......... 73/118.2 |
| 2004/0074291 A1 * | 4/2004 | Lenzing et al. ............ 73/118.1 |

FOREIGN PATENT DOCUMENTS

| | | |
|---|---|---|
| DE | 100 65 362 | 7/2001 |
| DE | 101 35 142 | 10/2002 |
| EP | 1 091 195 | 4/2001 |
| JP | 2000-304585 | 11/2000 |

\* cited by examiner

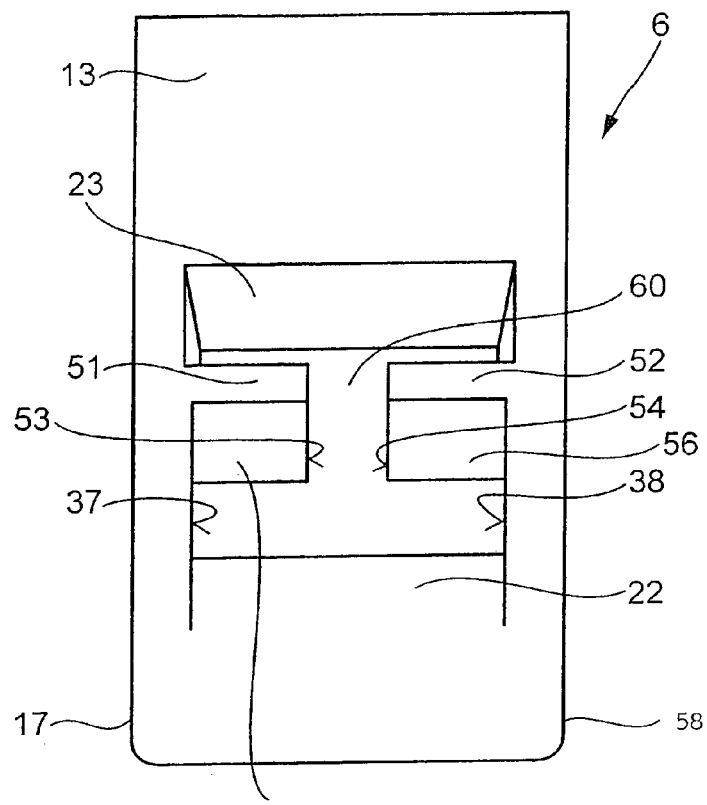
Fig. 2
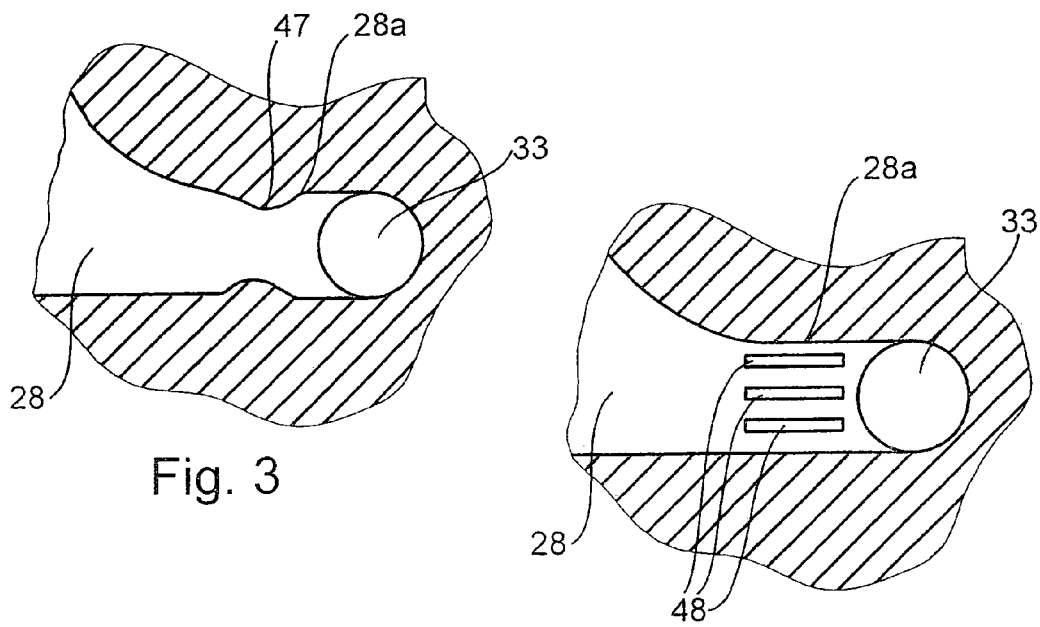
Fig. 3
Fig. 4

DEVICE FOR DETERMINING AT LEAST ONE PARAMETER OF A MEDIUM FLOWING IN A LINE

FIELD OF THE INVENTION

The present invention relates to a device for determining at least one parameter of a medium flowing in a line.

BACKGROUND INFORMATION

German patent document no. 196 23 334 refers to a device for determining the mass of a medium flowing in a line, having a part which is inserted into the line and in which a channel structure is provided, the channel structure including a single measuring channel in which a measuring element is situated. Devices of this kind may be used, for example, as air-mass meters in the air-intake tract of an internal combustion engine. Spray water and dust are able to enter the air-intake tract. Moreover, when shutting down the internal combustion engine, oil vapor may enter the air-intake tract through the crankshaft ventilation inlet. In the case of the familiar devices, the fluid or solid particles transported with the medium, which penetrate into the channel structure of the device, flow past the measuring element and may soil and damage it.

SUMMARY OF THE INVENTION

The exemplary device according to the present invention is for determining at least one parameter of a medium flowing in a line, and may have the advantage that the danger of the measuring element being soiled or damaged by the fluid or solid particles transported with the medium is reduced, without at the same time negatively affecting the functioning of the device in determining the at least one parameter. Fluid or solid particles that have entered the input region flow past a branching point of the measuring channel before reaching a separation zone, where they leave the device again via a separation opening. Two projections protruding from mutually opposite interior walls of the input region into the input region advantageously deflect the flow and keep fluid and solid particles away from the measuring channel, while ensuring that a liquid film already formed does not tear off. The combination of projections and separation zone overall achieves sufficient water deflection without noticeably impairing the functioning of the device in determining the at least one parameter when measuring the air mass, for example.

Because a gap separates the mutually facing ends of the at least two projections, liquid droplets may advantageously enter the separation channel directly through the gap between the projections and may quickly exit the channel structure.

A throttle structure provided in a separation channel of the separation zone has the advantageous effect that, while the size of the separation opening and the quantity of separated liquid remain constant, the quantity of medium (e.g. air) flowing through is throttled in the separation channel, and thus a larger quantity of the medium that has entered the input region reaches the measuring channel.

BRIEF DESCRIPTION OF THE DRAWINGS

FIG. 2 shows an elevation view of side 13 of element 6 in FIG. 1

FIG. 3 shows an enlarged detail cross-section of FIG. 1 with a first modification of the separation channel.

FIG. 4 shows an enlarged detail cross-section of FIG. 1 with a second modification of the separation channel.

DETAILED DESCRIPTION

Figure 1:
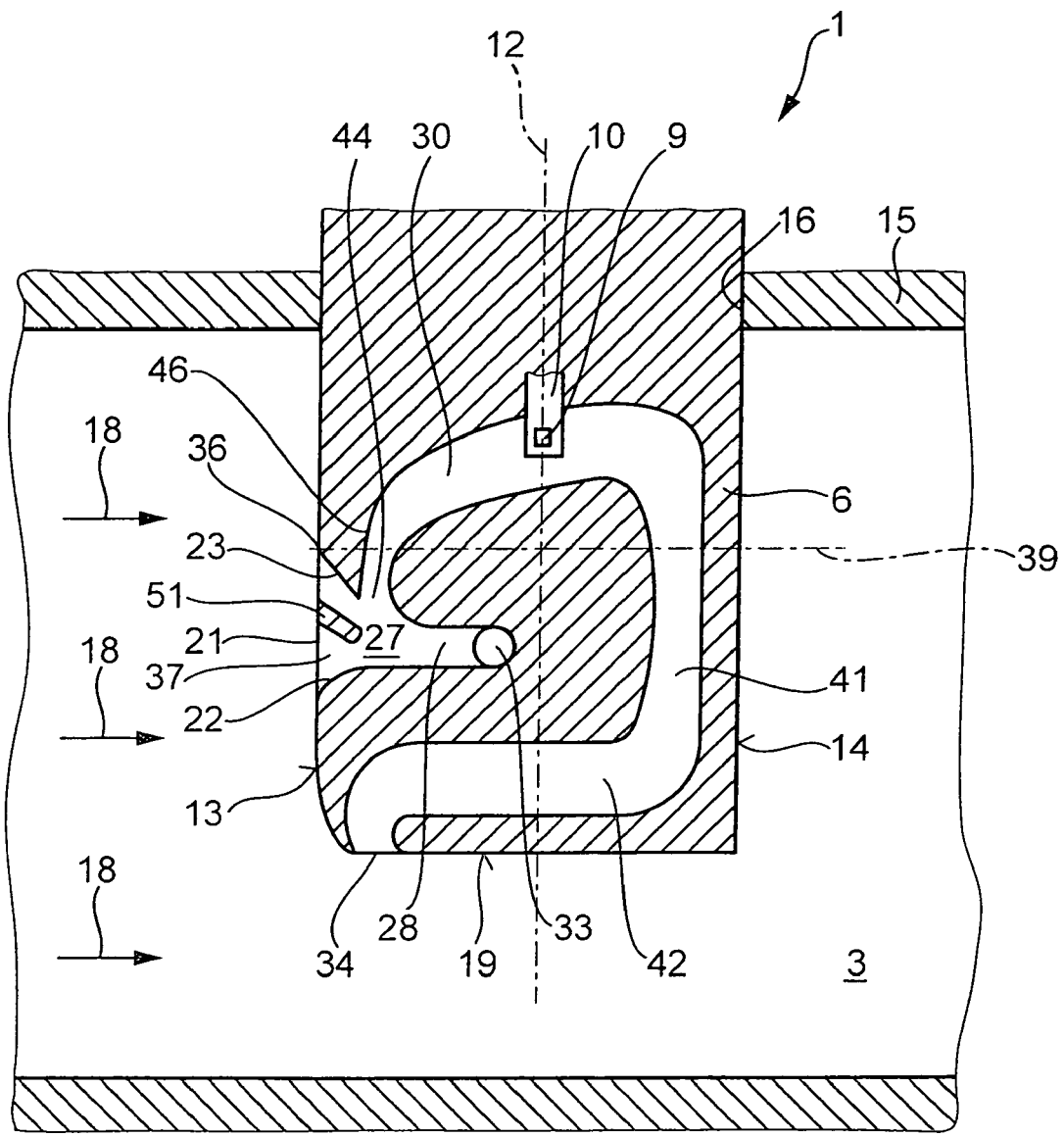
FIG. 1 shows an exemplary embodiment of the device according to the present invention in an installed state at a line.

FIG. 1 shows a line 3 in which a medium flows in a main flow direction 18. The line may be, for example, an intake manifold of an internal combustion engine. The medium is, for instance, the air flowing in the intake manifold. A device 1 is situated at line 3 in such a way that a part 6 of the device protrudes into line 3 and is exposed to the medium flowing in line 3 at a predetermined alignment. In addition to part 6 in the form of a measuring housing, device 1 for determining at least one parameter of the medium also includes a carrier part, not shown in detail, having an electrical connection, an evaluation electronics being accommodated, for example, in the carrier part. Together with part 6, device 1 may be inserted, for example, through an insertion opening 16 of a wall 15 of line 3, wall 15 delimiting a flow cross-section of line 3. The evaluation electronics may be positioned inside and/or outside of the flow cross-section of line 3.

For example, in device 1, a measuring element 9 whose measurement data may be evaluated by the evaluation electronics is used on a measuring element carrier 10. With the aid of measuring element 9, for example, the volumetric flow or the mass flow of the flowing medium is determined as a parameter. Additional parameters which may be measured are, for instance, pressure, temperature, concentration of a medium component or flow velocity, which are determined using suitable sensors.

Device 1 has, for instance, a longitudinal axis 12 in the axial direction, which, for example, proceeds into line 3 in the insertion direction of device 1, and which may also be, for example, the center axis. The direction of the flowing medium, in the following known as the main flow direction, is indicated by corresponding arrows 18 in FIG. 1, and runs there from left to right. When installing part 6 into line 3, it is ensured that part 6 has a predetermined orientation with respect to main flow direction 18 of the medium.

Part 6 has a housing having, for example, a rectangular-shaped structure, including a front wall 13 facing towards and a back wall 14 facing away from main flow direction 18 of the medium in the installation position, a first side wall 17 and a second side wall 58 (FIG. 2), and a third wall 19 running, for example, parallel to the main flow direction. In addition, part 6 has a channel structure located therein, having an input region 27 and a measuring channel 30 branching off from input region 27. The positioning of device 1 relative to line 3 ensures that the medium flowing in main flow direction 18 impinges upon part 6 in a predetermined direction and that a partial flow of the medium in this direction reaches input region 27 through an opening 21 at front side 13. Opening 21 may be aligned perpendicular to main flow direction 18, for example, but another orientation of opening 21 to main flow direction 18 is conceivable as well. Starting from input region 27, the medium partially reaches measuring channel 30 provided with measuring element 9 and partially continues to flow into a separation zone 28, located downstream of the branching point for the measuring channel, which is connected to line 3 through at least one separation opening 33 situated in first side wall 17 and/or in second side wall 58 and/or in wall 19. In the exemplary embodiment shown in FIG. 1, main flow direction 18 runs in a plane in which separation opening 33 is situated as well. However, the plane in which separation opening 33 is located may also be situated at an angle differing from zero degrees to main flow direction 18.

A first partial flow of the medium that has entered input region 27 flows completely into measuring channel 30 and a second partial flow flows completely through the one separation opening 33. The flowing medium contains, for example, liquid and/or solid particles such as oil or water particles, which could soil or damage measuring element 9. Through separation opening 33, the liquid and solid particles are able to flow back into line 3, as will be explained in more detail.

In axial direction 12, opening 21 at front side 13 of part 6 has an upper edge 36, which is closest to measuring element 9 in axial direction 12. An imaginary upper plane 39 runs through upper edge 36 as well as perpendicular to the plane of the drawing in FIG. 1 and parallel to the main flow direction 18. Separation opening 33 is situated in axial direction 12 below this upper plane 39. In the area of opening 21, input region 27 is provided with slanted or curved surfaces 22 and 23 and with projections 51,52, which are constructed in such a way that the medium flowing into the input region is steered away from upper plane 39. Since the liquid and/or solid particles are larger and have a greater density than the gaseous flowing medium, they move in axial direction 12, away from upper plane 39. Since separation opening 33 is situated below upper plane 39, the liquid and solid particles collect in separation zone 28 and are sucked out into line 3 by the air flowing past separation opening 33.

Starting from input region 27, a first section of measuring channel 30 extends approximately in the direction of insertion opening 16. In this section, downstream of branching point 44, is a first tapering 46 which accelerates the medium flowing in the measuring channel, the air thereby being sucked out of input region 27. Downstream of the first tapering, the flowing medium in measuring channel 30 is deflected, and then flows, for example, approximately in main flow direction 18 past measuring element 9. In the region of measuring element 9 there may be, for example, a second tapering of measuring channel 30. The first and second tapering, respectively, may be designed in the form of a narrowing on all sides or a partial narrowing of the lateral surfaces of measuring channel 30. From measuring element 9, the medium continues to flow and is deflected into a section 41 of the measuring channel, extending away from insertion opening 16 in axial direction 12. From this section, the medium is deflected into an additional section 42 which runs, for example, counter to main flow direction 18 and which discharges into line 3 at an exit opening 34 situated, for example, perpendicular to main flow direction 18 or at an angle differing from zero degrees to main flow direction 18. In this exemplary embodiment, measuring channel 30 is designed approximately in a C-shape, for example.

FIG. 2 shows an elevation view of front side 13 of part 6 from FIG. 1. As can be seen, two projections 51 and 52 designed in mirror symmetry to each other protrude from mutually opposite interior walls 37,38 of input region 27 transversely to main flow direction 18 into input region 27. The two mutually facing ends 53,54 of projections 51,52 are separated by a gap 60, so that the two projections 51 and 52 have approximately the contour of two shoulders of a bridge that are facing each other but are separated from each other by a gap. Surfaces 55,56 of projections 51,52 facing the main flow direction are partially beveled relative to main flow direction 18, beveled surfaces 55,56 and main flow direction 18 forming an angle of intersection that is different from zero degrees. Due to the transversal positioning of surfaces 55,56 relative to the flowing medium, the medium flowing into input region 27 is specifically steered away from branching point 44 of measuring channel 30 and towards separation zone 28. This provides for a more effective way of preventing liquid and solid particles from entering measuring channel 30. Due to the fact that mutually facing ends 53,54 of the at least two projections are separated from each other by gap 60, liquid droplets may reach separation zone 28 directly by passing between the projections. The structural design of the input region with the projections achieves good deflection of liquid, without impairing the functioning of measuring element 9 through an insufficient air flow.

FIG. 3 shows an enlarged section of FIG. 1 for another exemplary embodiment of the present invention. FIG. 3 depicts separation zone 28. As described above, having entered input region 27, liquid and/or solid particles reach separation zone 28, from where they subsequently reach separation openings 33. Separation zone 28 has a separation channel 28a, provided with a throttle structure 47, which discharges into separation opening 33. In this exemplary embodiment, the throttle structure is formed by a section 47 of separation channel 28a having a tapered cross-sectional area. The tapering may be continuous or discontinuous. While the quantity of water separation remains constant, the throttle structure advantageously throttles the air quantity flowing through the separation channel, and a greater air quantity thereby reaches the measuring channel.

FIG. 4 shows an additional exemplary embodiment, in which the throttle structure is formed by ribs 48 situated at the inner wall of separation channel 28a and may run in the direction of separation. The ribs reduce flow velocity and increase throughput through the measuring channel.

What is claimed is:

1. A device for determining at least one parameter of a medium flowing in a line, the parameter including an intake air mass of an internal combustion engine, the device comprising:
a part which has at least one measuring channel to conduct at least one partial flow of the medium flowing in the line in a main flow direction and which is insertable into the line with a predetermined alignment with respect to the main flow direction; and
at least one measuring element situated in the measuring channel to determine the at least one parameter;
wherein in the part, a channel structure is formed having an input region for an entry of a partial flow of the medium, and having a measuring channel branching off from the input region, the input region having a separation zone having a separation opening, at least two projections protruding from mutually opposite interior walls of the input region into the input region.

2. The device of claim 1, wherein mutually facing ends of the at feast two projections are separated from each other by a gap.

3. The device of claim 1, wherein the at least two projections are in mirror symmetry to each other.

4. The device of claim 1, wherein the at least two projections are situated in the area of an opening of the input region facing the main flow direction and protrude transversely to the main flow direction into the input region.

5. The device of claim 1, wherein surfaces of the at least two projections facing the main flow direction are at least partially beveled or curved relative to the main flow direction.

6. The device of claim 1, wherein the separation zone includes a separation channel having a throttle structure and discharges into the separation opening.

7. The device of claim 6, wherein the throttle structure is formed by a section of the separation channel having a tapered cross-sectional area.

8. The device of claim 6, wherein the throttle structure is formed by ribs situated at an inner wall of the separation channel.

9. The device of claim 6, wherein the throttle structure is formed by ribs situated at an inner wall of the separation channel and that run in the direction of separation.

* * * * *